(No Model.)

C. K. DODGE.
PACKING GASKET.

No. 505,703. Patented Sept. 26, 1893.

Witnesses:
John Buckler
Isabel Chester

Inventor:
Cheever K. Dodge
By A. M. Pierce,
Attorney.

UNITED STATES PATENT OFFICE.

CHEEVER K. DODGE, OF NEW YORK, N. Y., ASSIGNOR TO THE METROPOLITAN RUBBER COMPANY, OF CONNECTICUT.

PACKING-GASKET.

SPECIFICATION forming part of Letters Patent No. 505,703, dated September 26, 1893.

Application filed December 27, 1892. Serial No. 456,298. (No model.)

*To all whom it may concern:*

Be it known that I, CHEEVER K. DODGE, a citizen of the United States, residing in the city, county, and State of New York, have invented a new and useful Improvement in Packing-Gaskets, of which the following is a specification.

My invention relates especially to gaskets employed for packing steam pipe and valve connections, &c., and has for its object the provision of a simple, cheap and effective gasket, easy to apply, and which shall prevent any possible leakage when in place.

To attain the desired end, my invention consists essentially in a split ring, made of elastic material, in combination with a coupling or thimble, also made of elastic material, and adapted and arranged to pass over the split portion of the ring, and be compressed with the completed gasket, when placed in position for use; all of which will be hereinafter first fully described, and then pointed out in the claims.

Figure 1:
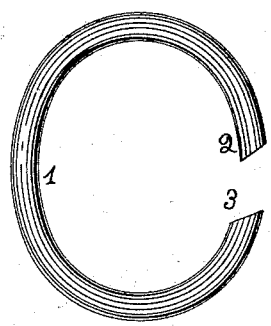
Figure 2:
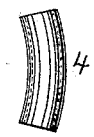
Figure 3:
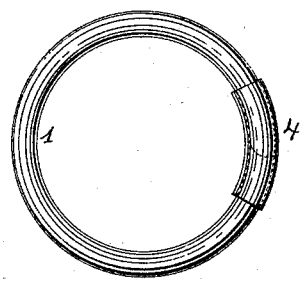
Figure 4:
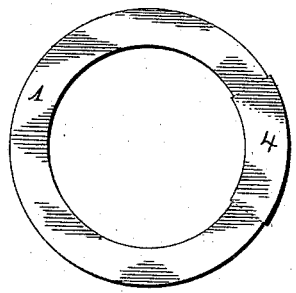

In the accompanying drawings Figure 1 illustrates the split ring, and Fig. 2 the coupling or thimble. Fig. 3 shows said parts in position, and Fig. 4 illustrates a gasket as compressed when in use.

Similar numerals of reference, wherever they occur, indicate corresponding parts in all the figures.

1 is the body of a gasket, said body being round, square, oblong, or of any desired shape in cross-section, and made of any preferred elastic material or composition. In practice, this material may be kept in coils or lengths, and cut off in just the required quantity to make each gasket, the ends being beveled, as at 2, 3, in order to overlap each other when in position.

4 is a coupling or thimble, also made of elastic, compressible material, and arranged to slip over the meeting ends of the body 1, as fully illustrated in Fig. 3.

When a gasket is constructed, as illustrated in Fig. 3, and is placed between the parts to be connected, it will be compressed and flattened, as in Fig. 4. The coupling will effectually unite the meeting ends of the body, and prevent any possible leakage. It will thus be seen that I have provided an extremely simple, cheap and effective packing gasket, which is easily and quickly fitted to any desired size.

Having now fully described my invention, what I claim as new therein, and desire to secure by Letters Patent, is—

1. A packing gasket, in which is comprised a solid, split body, made of elastic, compressible material, and a coupling, also of elastic, compressible material, adapted and arranged to pass over the meeting ends of said body, and be compressed upon the exterior thereof, covering the split, substantially as shown and described.

2. A packing gasket consisting of a split ring of elastic material, the meeting ends of said ring being arranged to overlap each other, as set forth, in combination with a coupling, also made of elastic material, and arranged to pass over the split in the ring body, substantially as shown and described.

CHEEVER K. DODGE.

Witnesses:
A. M. PIERCE,
ISABEL CHESTER.